No. 840,469. PATENTED JAN. 8, 1907.
C. W. BERRY.
APPARATUS AND PROCESS FOR FILLING RUBBER TIRES WITH VISCOUS LIQUIDS.
APPLICATION FILED MAR. 8, 1906.
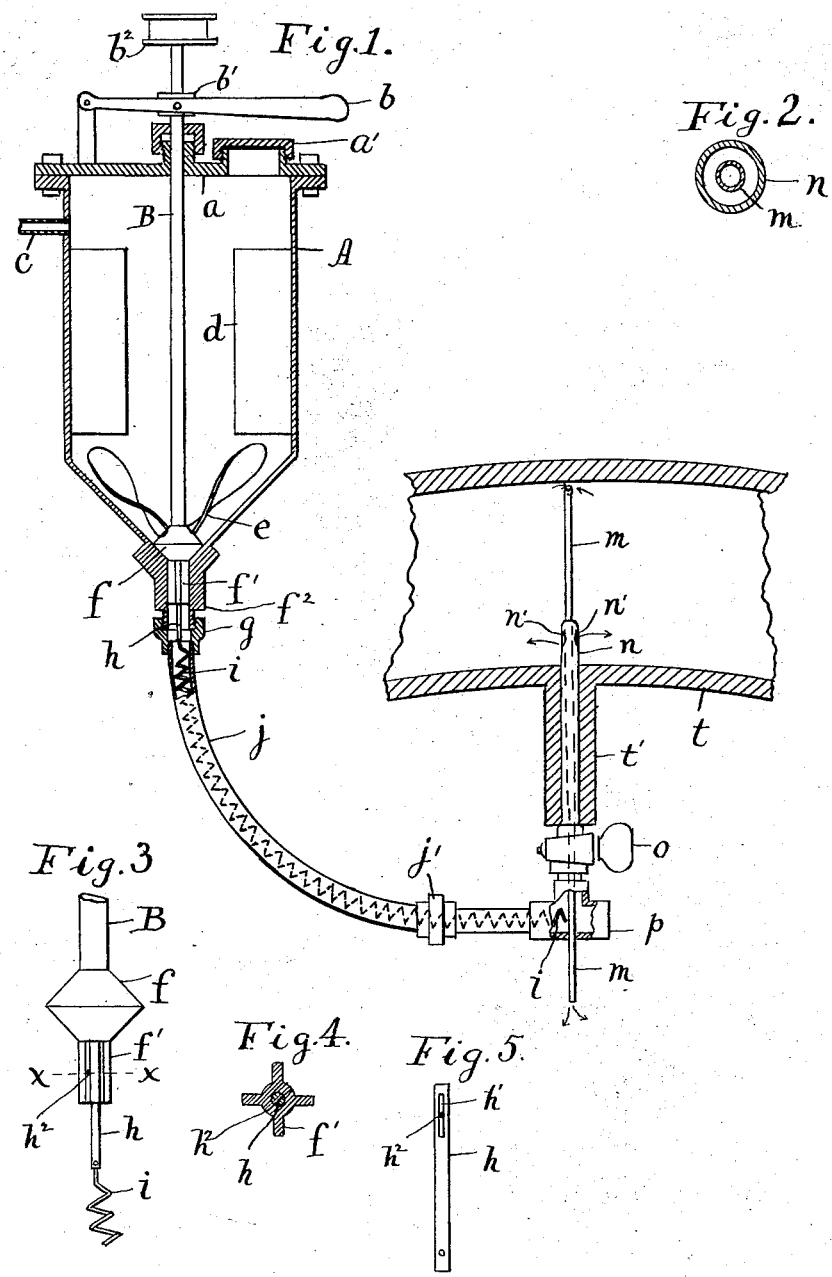
Witnesses:
Geo. M. Palmer
Mary A. Donaldson
Inventor:
Charles W. Berry
by S. W. Bates Atty.

UNITED STATES PATENT OFFICE.

CHARLES W. BERRY, OF PORTLAND, MAINE.

APPARATUS AND PROCESS FOR FILLING RUBBER TIRES WITH VISCOUS LIQUIDS.

No. 840,469. Specification of Letters Patent. Patented Jan. 8, 1907.

Application filed March 8, 1906. Serial No. 304,914.

*To all whom it may concern:*

Be it known that I, CHARLES W. BERRY, a citizen of the United States of America, and a resident of Portland, Maine, have invented certain new and useful Improvements in Apparatus and Process for Filling Rubber Tires with Viscous Liquid, of which the following is a specification.

My invention relates to a method of and apparatus for filling rubber tires with viscous liquid, which subsequently hardens to form a resilient compressible filling to take the place of air.

In filling tires with this liquid compound it is necessary to expel all the air from the tire as the air is displaced by the filling material. Hitherto it has been common to turn the tire so that the nipple would be at the lower level and force in the liquid through the nipple, puncturing the tire at or near the top to let out the air.

The object of my invention is to fill the tire without puncturing it; and a further object is to provide for the thorough agitation of the solution in the supply-tank and on the way to the filling-tube when the liquid contains a substance which readily separates and settles. These objects I accomplish by means of the apparatus hereinafter shown and claimed.

I illustrate my invention by means of the accompanying drawings, in which—

Figure 1 shows a sectional view of the filling-tank, a portion of the tire and filling mechanism. Fig. 2 is a cross-section through the filling-tube. Fig. 3 is a side elevation of the outlet-valve of the tank. Fig. 4 is a cross-section of the lower valve stem or guide, and Fig. 5 is a detail of the tube which retains the end of the spiral agitator of the supply-pipe.

In the drawings, $t$ represents a section of the tire, including the nipple $t'$, the tire being placed so that its nipple is in its highest position and the highest point of the tire being directly above the nipple. The liquid is forced in and the air allowed to escape by a filling-tube and an air-tube, which pass together through the nipple, the air-tube terminating beyond the end of the filling-tube and substantially at the highest point of the air-chamber in the tire. As here shown, I place the air-tube $m$ inside of the filling-tube $n$, the inner end of the filling-tube having lateral openings $n'$, by which the liquid is directed each way from the nipple and is allowed to run down on each side of the tire and is prevented from being forced up to the air-intake.

For supporting the filling-tube I provide an elbow $p$, and a cock $o$ is inserted between the elbow and the filling-tube for shutting off the supply when the tire is full. The air-tube, as shown, extends through the filling-tube with space enough around it to allow the liquid to enter, and the air-tube extends out through an opening in the elbow.

Connection is made with the elbow $p$ by the supply-pipe $j$, provided with a union $j'$. The supply-pipe I prefer to make curved, as here shown, so that it may vertically enter the bottom of the supply-tank. The pipe $j$ may be either a flexible hose or a bent pipe.

In using certain kinds of filling liquid containing a heavy substance liable to settle and clog I find it desirable to agitate the liquid in the supply-tank and also on its passage through the supply-pipe. I therefore provide in the supply-pipe an agitator, which I here show as a spiral flexible worm extending from the outlet of the tank and terminating at the elbow $p$. The upper end of the worm is secured to the lower end of a holding-tube $h$, which is inserted, as shown, in the lower end of the valve-stem $f'$ of the valve $f$.

The connection of the tube $h$ with the valve-stem is made by a pin $h^2$, which passes through the valve-stem and through a vertical slot $h'$ in the tube, by which the valve is free to move vertically without disturbing the position of the worm. The valve $f$ is seated in a valve-seat formed in the casting $f^2$ at the lower end of the hopper-bottom of the supply-tank A. The valve-stem $f'$ is cut away to let the liquid pass, and, as here shown, it is made with a cross-section in the shape of a cross, leaving vertical openings on four sides For the purpose of rotating the worm $i$ and agitating the contents of the tank I provide a vertical shaft B, which is secured to the top of the valve $f$ and acts as a valve-stem and also as a shaft to rotate the agitator $e$, which is secured to the lower portion of the shaft as near as possible to the bottom.

In order to prevent the contents of the tank A from rotating as the agitator $e$ turns, I provide wings or vanes $d$, which extend inward from the sides of the tank and tend to check any tendency of the contents of the tank to revolve.

The tank A is provided with a tight cover

*a*, with an opening for the introduction of the liquid with a suitable tight cover *a'*. A stuffing-box is provided through which passes the vertical shaft B, having on its upper end a suitable pulley $b^2$. Means are provided for lifting the shaft and valve to let out the liquid when the tire is to be filled. For this purpose I provide a hand-lever *b*, connected to the shaft by a yoke *b'*. Pressure is put on the surface of the liquid to force it out of the tank by means of the inlet-pipe *c*, through which air or other pressure may be introduced.

From what has been said the manner of using my apparatus is evident. The liquid is introduced through the opening in the top of the tank, the hole is then closed, the agitator is then started, and air-pressure is admitted through the pipe *c*. The filling-tube is inserted into the nipple with the air-tube pushed in until it reaches the upper wall of the tire. The valve *f* is then opened by lifting the shaft which revolves the agitator *e* and also the worm *i*. As the liquid passes through the pipe *j* it is continually kept in motion by the action of the worm *i*. The liquid comes out laterally from the inner end of the filling-tube and flows down the sides of the tire, the displaced air escaping through the tube *m*. When the tire is entirely full and the liquid comes through the air-pipe *m*, the valve *f* is closed, the air-tube is withdrawn, and the opening in the elbow is plugged. The valve *f* is then opened long enough to raise the pressure in the tire to any desired pressure lower than the tank-pressure, the cock *o* closed, and the filling-tube is allowed to remain in place while the liquid is hardening, after which it is removed.

The filling-tube may be held in place by hand or tied or otherwise suitably secured during the operation of the filling. By the use of my process and apparatus tires may be quickly and easily filled without the necessity of being punctured at any point.

It is evident that instead of letting the air out through the air-tube the top of the tire may be punctured directly over the inner end of the filling-tube; but I prefer to carry out the process as described.

I claim—

1. The herein-described apparatus for filling rubber tires which consists of a filling-tube adapted to be inserted into the nipple, having lateral discharge-openings at its inner end, an air-tube inside said filling-tube closing the extreme inner end of the same and having its inner end extending beyond the end of the filling-tube and means for supplying the liquid under pressure to said filling-tube.

2. The herein-described apparatus for filling rubber tires with viscous liquid which consists of a filling-tube adapted to be inserted in the nipple, an elbow-fitting in which said filling-tube is inserted, a valve in said filling-tube, an air-tube extending through said elbow and said filling-tube and adapted to be withdrawn therefrom and a supply-pipe connected with said elbow.

3. The herein-described apparatus for filling rubber tires consisting of a filling-tube, a supply-pipe connected with said filling-tube, a supply-tank to which said supply-pipe is connected, an agitator in said supply-tank and an agitator extending longitudinally of said supply-pipe.

4. The herein-described apparatus for filling rubber tires consisting of a filling-tube, a supply-pipe connected to said filling-tube, a worm-agitator adapted to rotate in said supply-pipe, a supply-tank to which said supply-pipe is connected and an agitator therein.

5. The herein-described apparatus for filling rubber tires consisting of a filling-tube, a curved supply-pipe connecting with said filling-tube, a filling-tank to the bottom of which said supply-pipe is connected, a vertical shaft in the said supply-tank, an agitator thereon, and a flexible spiral worm extending longitudinally through said supply-pipe and connected with the lower end of said shaft.

6. The herein-described apparatus for filling rubber tires consisting of a filling-tube, a supply-pipe connecting with said filling-tube, a supply-tank having a hopper-shaped bottom, a valve-seat at the outlet of said tank, a valve fitting said valve-seat, a vertical shaft secured by its lower end to said valve, an agitator on said shaft near its lower end and a lever for lifting said shaft and opening said valve.

Signed at Portland, Maine, this 5th day of March, 1906.

CHARLES W. BERRY.

Witnesses:
S. W. BATES,
A. LEON SCOTT.